United States Patent [19]
McNair

[11] Patent Number: 5,386,100
[45] Date of Patent: Jan. 31, 1995

[54] CONTROL ARRANGEMENT FOR IMMERSION LIQUID HEATERS

[75] Inventor: John D. McNair, Victoria, Australia

[73] Assignee: Black & Decker Inc., Newark, Del.

[21] Appl. No.: 142,525

[22] Filed: Oct. 25, 1993

[30] Foreign Application Priority Data

Oct. 30, 1992 [AU] Australia .............. PL5615

[51] Int. Cl.$^6$ .............................. H05B 3/82
[52] U.S. Cl. .................. 219/437; 392/501;
                              392/498; 392/453; 392/452
[58] Field of Search ............ 219/437; 392/498, 501, 392/452, 453

[56] References Cited

U.S. PATENT DOCUMENTS

| 2,455,688 | 12/1948 | Malickson | 392/501 |
| 2,467,749 | 4/1949 | Hodsdon | 392/498 |
| 2,475,403 | 7/1949 | Quinn | 392/498 |
| 3,135,860 | 6/1964 | Czarnecki | |
| 3,446,940 | 5/1969 | Morgan | 392/501 |
| 3,725,643 | 4/1973 | Clausse | 392/501 |
| 4,044,224 | 8/1977 | Jenkins | 392/498 |
| 4,068,116 | 1/1978 | McKinstry | 392/498 |
| 4,072,847 | 2/1978 | Craven | |
| 4,752,671 | 6/1988 | Foster | 392/498 |
| 5,020,128 | 5/1991 | Bleckmann | 392/498 |

FOREIGN PATENT DOCUMENTS

| 48801 | 1/1990 | Australia . |
| 14962 | 4/1992 | Australia . |
| 3615932 | 5/1986 | Germany . |
| 1007156 | 10/1965 | United Kingdom . |
| 1408389 | 10/1975 | United Kingdom . |
| 1548166 | 7/1979 | United Kingdom . |
| 2055248 | 2/1981 | United Kingdom . |
| 2098436 | 5/1981 | United Kingdom . |
| 2262207 | 11/1991 | United Kingdom . |
| 2257341 | 6/1992 | United Kingdom . |
| WO9300780 | 1/1993 | United Kingdom . |
| 2265071 | 9/1993 | United Kingdom . |
| WO90/09672 | 8/1990 | WIPO . |
| WO92/05675 | 4/1992 | WIPO . |
| WO92/20086 | 11/1992 | WIPO . |
| WO93/00780 | 1/1993 | WIPO . |
| WO93/01640 | 1/1993 | WIPO . |
| WO93/18631 | 9/1993 | WIPO . |
| WO93/18632 | 9/1993 | WIPO . |

OTHER PUBLICATIONS

Abstract—Engel—Electrical Immerison Heater Having Dry-Out Protection Device, W. Germany, Nov. 19, 1987.

Primary Examiner—Teresa J. Walberg
Attorney, Agent, or Firm—Barry E. Deutsch

[57] ABSTRACT

An electric immersion water heater comprises a vessel with a heating element having cold tail ends extending individually through a side wall of the vessel. Temperature sensing elements sense temperature levels of an outer wall of the heating element outwardly of the vessel and are arranged to disconnect power to the element upon either a boil condition within the vessel occurring or upon sensing an elevated temperature indicative of dry or partially dry operation within the vessel. The heating element further including a jacket defining a space around the outer wall of a core part of the heating element within the vessel adjacent the vessel wall and arranged to fill with steam upon a boil condition occurring in the vessel during normal operation.

5 Claims, 3 Drawing Sheets

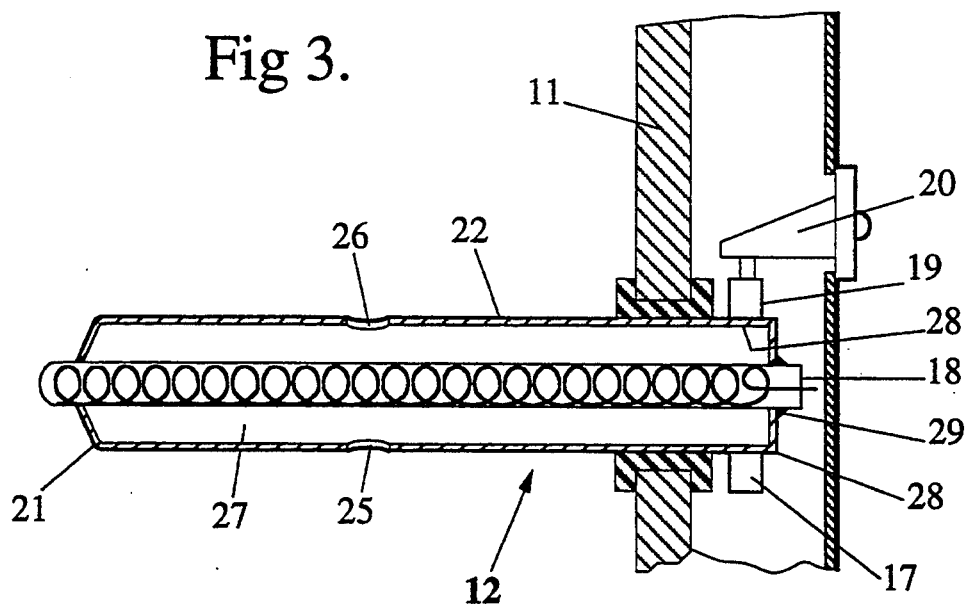
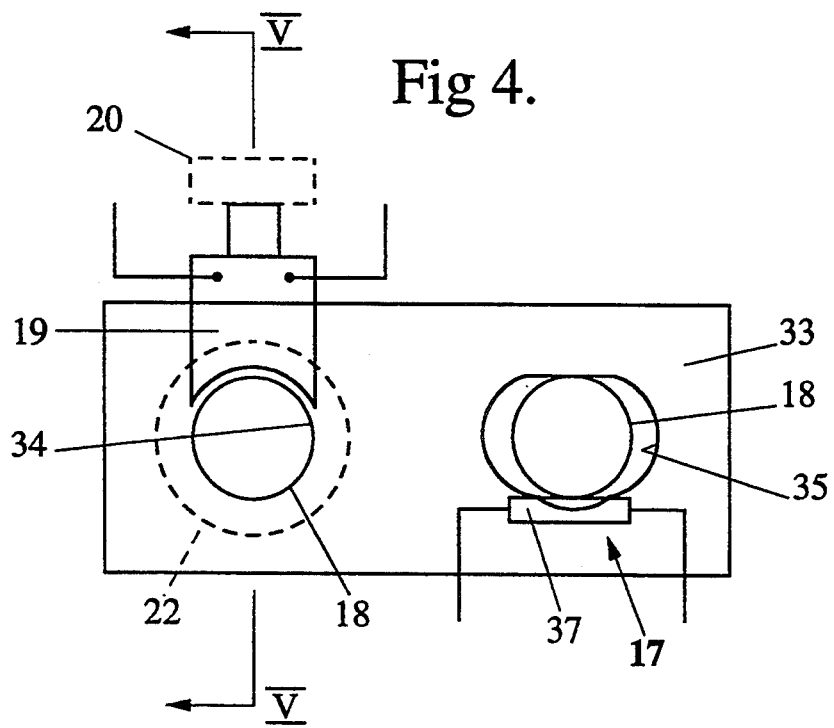

CONTROL ARRANGEMENT FOR IMMERSION LIQUID HEATERS

BACKGROUND OF THE INVENTION

The present invention relates to improvements in element construction and control for electric immersion liquid heaters.

Electric immersion liquid heaters are commonly found in kettles, jugs, urns, pans and the like. Such implements generally comprise a vessel adapted to contain a liquid to be heated, an electrically heated element located generally within a lower part of the vessel with power being supplied to the element through the wall of the vessel, and some form of control means which is sufficiently sensitive to detect element overheating in a dry or dry boil condition within the vessel so that power is disconnected from the element to avoid damage to the element and associated parts of the implement. With those types of implements where it is commonly desired to have an automatic turn off feature (e.g. kettles and jugs) upon boiling, then the control means will normally also include some form of resettable thermally activated means for sensing a boil condition and turning off the power to the element in response thereto, the means being capable of being reset for reuse of the implement. Typically this is achieved by using a resettable bi-metal switch onto which steam is directed when a boil condition exists in the liquid heating vessel. The location of the bi-metal switch may vary with common locations being either in the upper regions of the vessel or at a lower region adjacent the power connection to the heating element.

There are numerous designs or arrangements of implements of the aforementioned kind. One commonly used arrangement comprises an element formed in two loops in a W type format with the two outer legs (cold tail ends) projecting outwardly through a central plate and within the vessel being brought inwardly in a loop with the loop secured to the central plate by soldering. The point of soldering to the central plate being above the level of the two outer legs and this region is termed the "hot return" section of the element as it is normally the first part of the element to be exposed to air when liquid level drops (e.g. in a boil dry solution). The central plate is commonly circular and is located to overly a relatively large aperture in the vessel wall. Appropriate seals are required of sufficiently large diameter to seal the aperture in the vessel wall. On the outer side of the aperture a switch body is mounted (which is also sealed by suitable seals around the aperture) and includes appropriate control elements which commonly include a main boil dry control element sensing the temperature of the "hot return" section of the element by engagement with the rear wall of the central plate in the vicinity of the soldered connection of the "hot return" section to the central plate. One arrangement of the aforementioned kind is shown, for example, in Australian Patent No. 492533.

More recent, Australian Patent Specification Nos. 22438/92 and 51548/90 disclose arrangements where the heating element protection against excessive temperatures caused by dry operation is achieved by temperature responsive bimetallic switches sensing temperature of the cold tail ends of the resistance heating element outwardly of the vessel thereby avoiding the need to have a hot return portion of the element soldered to the central plate. The specifications, however, still use a large central plate through which the cold tail ends project.

While arrangements of the kind disclosed in Australian Patent No. 492533 have been used for some years and have operated quite satisfactorily, they do, however, have a number of disadvantages in practice. Firstly, the arrangement requires a relatively large opening in the vessel wall which then requires seals of a relatively large diameter which are expensive. Secondly heat sensing off the back of the central plate requires that the boil dry switch (commonly a bi-metal switch) be mounted with critical tolerances from the backing plate, that is the control unit must be critically positioned for correct operation. Thirdly, it is usual to mount from the central plate mounting spigots with threaded ends that are adapted to pass through bores in the control unit with nuts being threaded onto the outer ends of the spigots to hold the central plate (and heating element) to the control unit in the desired configuration. This, however, leads to significant manufacturing difficulties particularly in relation to maintaining tolerances on the heating element and central plate sub assembly which is not commonly made by the same supplier as the control unit. Fourthly, the resettable control (when used) to switch off power when liquid boils in the vessel can be mounted either with the main control unit or at some remote location. If it is mounted with the main control unit then there is commonly a complicated steam delivery path to the main control unit. Alternatively, if it is mounted at a remote location then there is a complication of separate mounting and wiring requirements. All the foregoing add to the difficulty and cost of assembling a liquid heating implement of this general type.

The objective of the present invention is to provide improvements in element construction and control for electric immersion liquid heaters which will avoid or minimize at least some of the aforementioned difficulties.

SUMMARY OF THE INVENTION

Accordingly, the present invention provides an arrangement in an electric immersion liquid heating implement comprising a heating element having two opposed end sections joined by an intermediate portion, said intermediate portion being adapted for location within a vessel capable of holding a liquid to be heated, each said end section being adapted to pass through an individual sealed aperture in a wall of said vessel, and a temperature responsive switch means in thermal communication with an outer surface portion of a respective one of said end sections of said heating element outwardly of said vessel, said temperature responsive switch means being adapted to disconnect power from said heating element upon a predetermined temperature level being sensed.

In accordance with a second aspect, the present invention comprises an arrangement in an electric immersion liquid heating implement comprising a heating element having two opposed end sections joined by an intermediate portion, said intermediate portion being adapted for location within a vessel capable of holding a liquid to be heated, each said end section being adapted to pass through a wall of said vessel, and temperature responsive switch means in thermal communication with an outer surface portion of a respective one of said end sections of said heating element outwardly of said vessel, and means communicating steam from within said vessel to a thermally conductive position relative to said temperature responsive switch means whereby said switch means is adapted to disconnect power from said heating element upon a predetermined temperature level indicative of a boil condition on said intermediate portion of said element being sensed. Conveniently, the means communicating steam includes a jacket means provided at least partially surrounding a core part of the intermediate length of the heating element inwardly of and adjacent the wall of the vessel. Preferably the jacket means provides a space at least partially surrounding the core part of the intermediate length and in use this space may extend to or through the wall of the vessel. The jacket means conveniently includes means to allow liquid to flow into the space defined by the jacket means and to allow vapour to escape therefrom. This may be achieved by a pair of holes in a wall of the jacket which may be of equal or unequal size. Valve means might be used, if desired to control flow through at least one of the flow holes.

The present invention also anticipates providing a liquid heating element incorporating a vessel, a heating element and a control arrangement as discussed above.

In accordance with a still further aspect, the present invention provides an electric immersion liquid heating element comprising a liquid retaining vessel, a heating element having opposed ends projecting through a liquid retaining wall of said vessel each with a first outer wall surface of said heating element within said vessel being in thermally conductive relationship with a second outer wall surface of said heating element outwardly of said vessel, and a control arrangement comprising a mounting member including first mounting means adapted to co-operate with at least one of said opposed ends of the heating element located outwardly of the vessel to mount said mounting member thereon, said control arrangement further including a thermally responsive switch means carried by said mounting member whereby, in use, said thermally responsive switch means is directly in thermal contact with at least part of the second outer wall surface of one of said opposed ends of the heating element. Preferably the mounting member is adapted to be mounted on both opposed ends of the heating element and is conveniently produced from an electrically insulating material such as a plastics material. Advantageously a second thermally responsive switch means is carried by said mounting member whereby, in use, said thermally responsible switch means is in direct thermal contact with at least part of the second outer wall surface of one of said opposed ends of the heating element. The first and second thermally responsive switch means may, in use, be in direct thermal contact with the same end of the heating element. Alternatively, the first and second thermally responsive switch means may be arranged, in use, to be in direct thermal contact with separate ends of the heating element. Preferably the first thermally responsive switch means is adapted to actuate at a sensed temperature lower than that at which the second thermally responsive switch means is adapted to actuate. Conveniently the first thermally responsive switch means is adapted to actuate at a sensed temperature indicative of boiling liquid in said vessel and is adapted to be externally reset. Preferably, the second thermally responsive switch means comprises a once only operation capability, that is, it is not capable of being reset or is at least not capable of being reset by external manipulation. If required, the second thermally responsive switch means may comprise a device, the state of which is physically irreversibly changed when actuated thereby preventing resetting of the second thermally responsive switch means.

In a particularly preferred aspect, the present invention provides a liquid heating implement comprising a vessel adapted to contain a liquid to be heated, an immersion heating element having opposed ends projecting through a liquid containing wall of the implement as discussed above and in combination therewith a control arrangement as defined above. Conveniently, in this aspect, the heating element in co-operable association with the first thermally responsive switch means has a substantially enclosed space surrounding a portion of the heating element inwardly of the vessel adjacent the vessel wall through which the heating element passes, said space having access means permitting water to flow into the space and permitting vapour to pass from the space.

BRIEF DESCRIPTION OF THE DRAWINGS

Several preferred embodiments will hereinafter be described with reference to the accompanying drawings, in which:

FIG. 3 is a sectional view showing an alternative to the arrangement shown in FIG. 2;

FIG. 4 is a schematic outer elevation view of a control mounting arrangement capable of use with the earlier shown embodiments;

DESCRIPTION OF THE PREFERRED EMBODIMENTS

Figure 1:
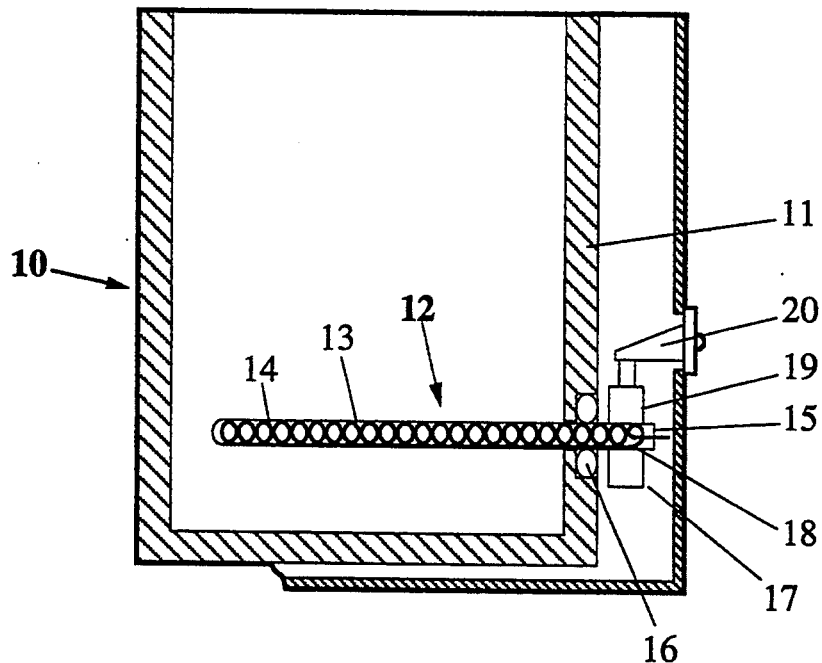
FIG. 1 is a partial cross-sectional view of a first embodiment.

Referring to FIG. 1, a vessel 10 is shown having an inner wall 11 adapted to contain a liquid to be heated by an immersion heating element 12. The element 12 may be U-shaped, W-shaped, spiralled or any other suitable formation. Conveniently the element 12 may comprise a tubular metallic outer wall 13 with an inner resistance winding 14 positioned therein as is well known in the art. The internal arrangement of the element 12 may be any format but it should be recognized that a so called "hot return" section of the element required in the prior art discussed earlier is not required in accordance with the present invention. Opposed end sections 15 (one of which is shown in FIG. 1) of the heating element 12 individually pass through apertures in the wall 11 and are individually sealed by small seals 16 which are of a material capable of sealing and resisting normal operating temperatures. A silicon rubber is believed to be appropriate for these seals but other materials might be equally appropriate.

Located outwardly of the wall 11 is a first control device 19 in the form of a first resettable temperature responsive element. This device 19 is provided in thermal contact with the outer wall surface 18 of the end section 15 of the heating element 12 outwardly of the wall 11 and is operable to disconnect power from the winding 14 when a temperature is sensed indicative of a boil situation within the vessel 10. This temperature is such that the power to the element is turned off when water boils in the vessel and the effective temperature in the vessel is lower than the effective temperature in the vessel at which the second control device 17 activates. Also located outwardly of the wall 11 is a second control device 17 including a second temperature responsive switch element which is in thermal contact with the outer wall surface 18 of the element 12 outwardly of the wall 11. The second control device 17 may be a boil dry (or dry start) protection element operating in a once off manner when a temperature level is sensed indicative of a dry start or boil dry situation arising. As discussed above the control device 17 may be irreversibly changed in state to prevent resetting when actuated by an excess temperature being sensed. It will of course be appreciated that the first control device 19 may be used without the second control device 17 when a non automatic implement is required. The actual temperature of the wall surface 18 sensed by the first and second control devices 19,17 may vary depending on the axial positioning of the element on the surface 18. The first control device 19 may be reset by an operator manipulating an external member 20 of any desired configuration. In this embodiment temperature is sensed by conduction of heat along the casing 13 of the heating element through the wall 11 of the vessel. The advantage achieved is a very simple construction with small and relatively inexpensive seals 16.

Figure 2:
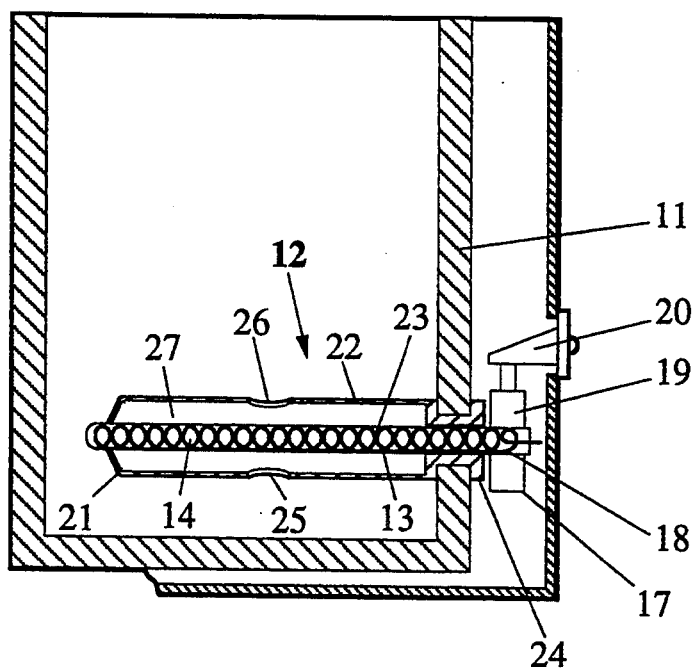
FIG. 2 is a partial cross-sectional view similar to FIG. 1 of a second embodiment.

FIG. 2 illustrates a similar arrangement but in this case a jacket 21 is formed by a wall 22 surrounding the core section 23 of the heating element. The jacket wall 22 may be formed from a silicon rubber made integrally with a seal 24 for the core section 23 passing through the wall 11. Alternatively the wall 22 might be separately produced from the seal 24 and if so, any suitable material might be used including thermally conductive material such as a metal. It is only necessary to have a jacket in this format on one of the legs of the heating element 12.

The jacket wall 22 has two holes 25 and 26. The lower hold 25 allows water to enter the space 27 within the jacket and the upper hole 26 allows vapour (or air) to escape from the space 27. In operation as a boil condition is approached, the space 27 very rapidly fills with steam and the temperature of the core outer wall 13 rapidly reaches a predetermined temperature at which the first control device 19 activates. The provision of the jacket thus improves accuracy or consistency of the temperature at which the first control device 19 activates. FIG. 3 illustrates an alternative arrangement to that which is shown in FIG. 2. In this case the jacket 21 is formed by a wall 28 of a thermally conductive material such as a metal passes through the wall 11 of the vessel. Because of this the outboard end of the wall 28 must be sealed at 29 (for example by soldering) to the outer wall 18 of the core of the heating element 12. In this case, the temperature responsive first and second control devices 19 and 17 may be arranged in thermal contact with the jacket wall 28, however operation is otherwise the same as with the embodiment of FIG. 2. Alternatively either or both the control devices 19-17 might be arranged outwardly of the jacket 28 in thermal contact with the core outer wall 13.

Figure 6:
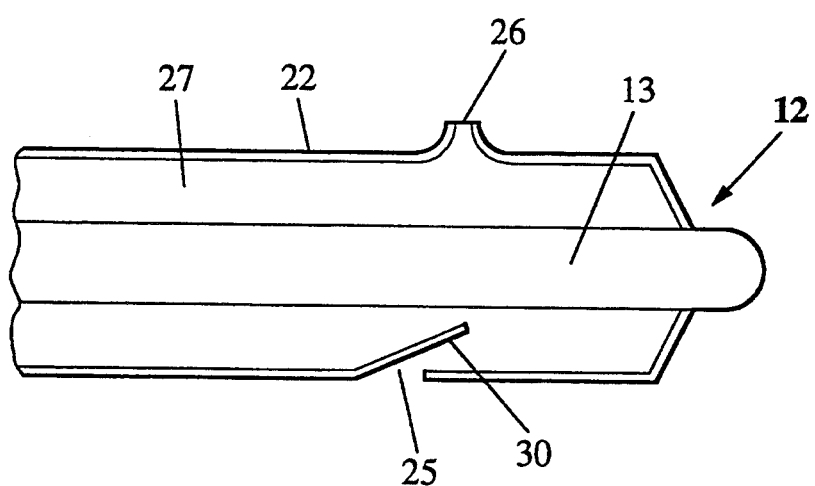
FIG. 6 is a view of part of FIGS. 2 or 3 showing still further possible alternative features.

FIG. 6 illustrates a still further arrangement where the jacket space 27 is defined by a molded material wall 22 (silicon rubber or the like) and where the apertures 25,26 are configured to assist the intended operation. The aperture 25 may, for example, include a flap valve 30 which is normally open but which is adapted to close under pressure of steam within the space 27 in a boil condition. The aperture 26 may be smaller than the opening 25 and may be configured to allow escape of air or steam from the space 27.

Figure 5:
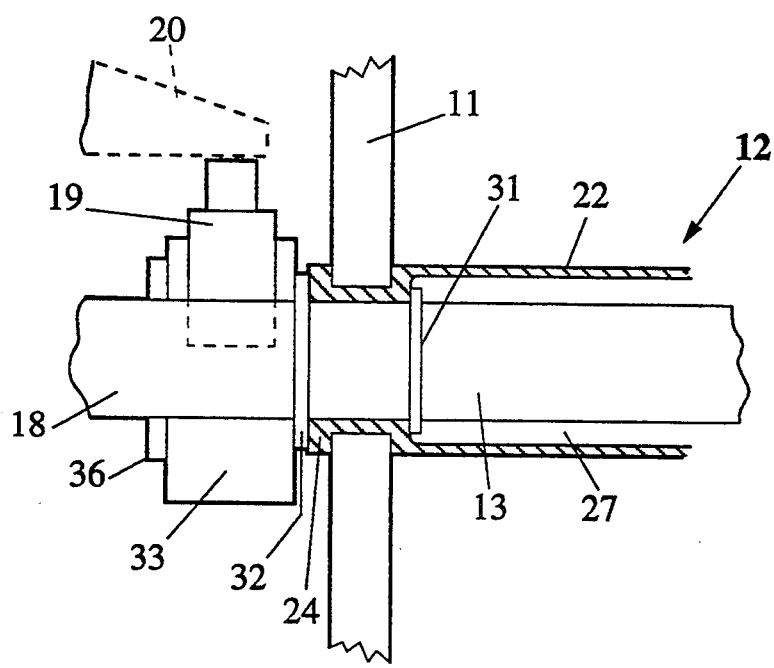
FIG. 5 is a sectional view along line V—V of FIG. 4.

FIGS. 4 and 5 illustrate a convenient means of simply mounting a control arrangement according to the present invention. As illustrated the core section of the heating element includes an inner flange 31 swaged onto the wall 13 with the outer wall 18 of the core part including a screw thread on which a speed nut 32 can be applied to secure the inner parts of the heating element and the seal 24 in position. Applied to the outer ends of the walls 18 of the core part of the heating element is a mounting member 33 which includes apertures 34 and 35 fitting over the walls 18. To facilitate assembly, one aperture 34 generally corresponds to the size of the wall 18 and the other aperture 35 is a slightly elongated slot. Again, speed nuts 36 might be applied to outer ends of the walls 18 to secure the mounting member in position as illustrated. The mounting member 33 may be formed from a plastics material. Appropriate apertures 34 or other mounting means may be provided in or associated with the member 33 to permit the thermally responsive control devices 19,17 to be mounted in engagement (as illustrated) with a respective one of the walls 18 of the ends of the core of the heating element 12. The switch device 17 might include a fusible link 37 so that it is destroyed (if activated) so that it needs to be replaced totally if the implement is to be reused.

While preferred embodiments of the invention have been described and illustrated, the invention should not be limited thereto but may be otherwise embodied within the scope of the following claims.

What is claimed is:

1. An arrangement in an electric immersion liquid implement comprising:

a heating element having two opposed end sections joined by an intermediate portion, said intermediate portion being adapted for location within a vessel capable of holding a liquid to be heated, each end section being adapted to pass through a wall of said vessel, and temperature responsive switch means in thermal communication with an outer surface portion of a respective one of said end sections of said heating element outwardly of said vessel, and means communicating steam from within said vessel to a thermally conductive position relative to said temperature responsive switch means whereby said switch means is adapted to disconnect power from said heating element upon a predetermined temperature level indicative of a boil condition on said intermediate portion of said element being sensed, said heating element including an inner part and jacket means forming a space at least partially surrounding said inner part of the heating element, said inner part and said jacket means being located inwardly of and adjacent to the wall of said vessel, with said space within said jacket means forming said means communicating steam, said space also extending through the vessel wall and terminating outwardly of said vessel wall, said jacket means being thermally conductive and said temperature responsive switch means being in thermal contact with said jacket means outwardly of said vessel, means permitting liquid access from said vessel to said space, and means permitting escape of vapor from said space, said liquid access means comprising at least one opening in a wall of said jacket means, said opening forming liquid access means including valve means to allow liquid into said space, said valve means being closed by vapor pressure in said space upon a liquid boil condition occurring.

2. An arrangement according to claim 1, wherein said one opening is formed in a lower region of said jacket means.

3. An arrangement according to claim 2, wherein said temperature responsive switch means includes a first control device adapted to disconnect power from said heating element upon a liquid boil condition being experienced within said vessel and a second control device adapted to disconnect power from said heating element upon sensing a temperature higher than that which actuates said first control device, each of said control devices being located in thermal conductive relation with the outer surface portion of a respective one of said end sections.

4. An arrangement according to claim 3, wherein said first and second control devices are arranged in thermal contact with the same said end section of the heating element.

5. An arrangement according to claim 3, wherein said first and second control devices are respectively arranged in thermal contact with different said end sections of the heating element.

* * * * *